(12) United States Patent
Song et al.

(10) Patent No.: US 10,467,031 B2
(45) Date of Patent: Nov. 5, 2019

(54) CONTROLLING A DISPLAY APPARATUS VIA A GUI EXECUTED ON A SEPARATE MOBILE DEVICE

(71) Applicant: Samsung Electronics Co., Ltd., Suwon-si, Gyeonggi-do (KR)

(72) Inventors: Hyung-joo Song, Suwon-si (KR); Jin-kyu Yoo, Seoul (KR); Tae-ho Kim, Suwon-si (KR); Kang-yong Park, Suwon-si (KR); Kyeong-woon Lee, Seoul (KR); Young-soo Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 418 days.

(21) Appl. No.: 14/182,621

(22) Filed: Feb. 18, 2014

(65) Prior Publication Data

US 2014/0237397 A1 Aug. 21, 2014

(30) Foreign Application Priority Data

Feb. 21, 2013 (KR) ........................ 10-2013-0018699

(51) Int. Cl.
*H04N 5/44* (2011.01)
*G06F 9/451* (2018.01)
(Continued)

(52) U.S. Cl.
CPC ............ *G06F 9/452* (2018.02); *H04N 5/4403* (2013.01); *H04M 1/72533* (2013.01); *H04N 21/4126* (2013.01)

(58) Field of Classification Search
CPC ............. H04N 21/4126; H04N 5/4403; H04N 2005/4425; H04N 7/173; H04M 1/72533; H04L 67/38; G06F 9/4445
(Continued)

(56) References Cited

U.S. PATENT DOCUMENTS 7,143,359 B2 11/2006 Aggarwal et al.
2003/0120714 A1 6/2003 Wolff et al.
(Continued)

FOREIGN PATENT DOCUMENTS

CN 1355994 A 6/2002
KR 10-2006-0107802 A 10/2006
(Continued)

OTHER PUBLICATIONS

Chinese Office Action with English translation dated Sep. 29, 2018; Chinese Appln. No. 201480009648.3.
(Continued)

*Primary Examiner* — Rinna Yi
(74) *Attorney, Agent, or Firm* — Jefferson IP Law, LLP

(57) ABSTRACT

A display apparatus and a control method thereof are provided. The display apparatus includes an image processor configured to process an image signal, a display unit configured to display an image based on the image signal, a storage section configured to store Graphic User Interface (GUI) information about a GUI to be displayed in a mobile device for controlling the display apparatus, a web server configured to communicate with a web browser of the mobile device, and a controller configured to transmit the stored GUI information to the mobile device if the web browser of the mobile device requests the GUI information through the web server, and to operatively control the display apparatus in accordance with control information received from the mobile device.

14 Claims, 9 Drawing Sheets

(51) Int. Cl.
*H04N 21/41* (2011.01)
*H04M 1/725* (2006.01)

(58) Field of Classification Search
USPC ........................................................ 715/761
See application file for complete search history.

(56) References Cited

U.S. PATENT DOCUMENTS

| | | | |
|---|---|---|---|
| 2003/0122869 A1 | 7/2003 | Aggarwal et al. | |
| 2005/0120096 A1* | 6/2005 | Rekimoto | G08C 17/02 709/220 |
| 2005/0198663 A1 | 9/2005 | Chaney et al. | |
| 2006/0164675 A1 | 7/2006 | Yamada et al. | |
| 2007/0229465 A1* | 10/2007 | Sakai | G08C 17/00 345/173 |
| 2008/0104391 A1* | 5/2008 | Fukuta | H04L 63/0272 713/153 |
| 2010/0277337 A1 | 11/2010 | Brodersen et al. | |
| 2011/0119386 A1* | 5/2011 | Murrett | H04L 65/1069 709/227 |
| 2011/0202631 A1* | 8/2011 | Berna Fornies | H04L 67/025 709/219 |
| 2012/0236160 A1 | 9/2012 | Rezek et al. | |
| 2013/0027613 A1* | 1/2013 | Kim | H04N 21/4126 348/563 |
| 2013/0152135 A1* | 6/2013 | Hong | H04N 21/4622 725/51 |

FOREIGN PATENT DOCUMENTS

| | | |
|---|---|---|
| KR | 20120002147 A | 5/2012 |
| WO | 00/78050 A1 | 12/2000 |
| WO | 02-097615 A2 | 12/2002 |

OTHER PUBLICATIONS

Korean Office Action with English translation dated Feb. 18, 2019; Korean Appln. No. 10-2013-0018699.

* cited by examiner

CONTROLLING A DISPLAY APPARATUS VIA A GUI EXECUTED ON A SEPARATE MOBILE DEVICE

CROSS-REFERENCE TO RELATED APPLICATION(S)

This application claims the benefit under 35 U.S.C. § 119(a) of a Korean patent application filed on Feb. 21, 2013 in the Korean Intellectual Property Office and assigned Serial No. 10-2013-0018699, the entire disclosure of which is hereby incorporated by reference.

TECHNICAL FIELD

The present disclosure relates to a display apparatus and a control method thereof More particularly, the present disclosure relates to a display apparatus and a control method thereof, in which an application is executed and a Graphic User Interface (GUI) is used to control the application.

BACKGROUND

A television (TV) or the like display apparatus may provide a variety of application services as well as a basic TV function. Recent trends include improvements to an interface with which a user may control functions of a display apparatus such as a Smart TV. Improvements to the interface with which the user may control function as of the display apparatus include developments to voice recognition, motion recognition, and the like. However, the most basic means for controlling the display apparatus is a remote controller. For example, the remote controller is still used as a main controller for executing and controlling an application in the display apparatus.

As an example, according to the related art, to more effectively execute the application, a launcher program (hereinafter, referred to as an 'application launcher') for executing the application may be used. The remote controller may be provided with a separate button for moving to such an application launcher. However, the application launcher may have a Graphic User Interface (GUI) specific thereto. Because the GUI for the application launcher hides a screen while a user watches a display on a TV, the user's experience of watching the TV may be disturbed.

Meanwhile, a remote controller according to the related art is useful for operating simple controls such as, for example, for up, down, left and right directional operations and execution. For example, after moving to the application launcher, four direction keys are used to move to a desired application and then an execution button is pressed to execute the application. However, in the case of attempting to perform controls more advanced than such simple controls such as, for example, if a user attempts to or is otherwise needed to input a character input, the user may experience difficulty in inputting characters because the four direction keys of the remote controller are used to move to a desired character on a virtual keyboard displayed on the screen of the TV. In other words, the user is required to use the four direction keys to navigate within the interface so as to individually select the desired character to input. Further, in the case of a touch-based application such as Angry Birds and the like, use of only the remote controller is insufficient to control the application without any separate device.

For example, if a remote controller according to the related art is used to execute and control the applications of the display apparatus, such a remote controller lacks usability as compared with a touch-based Smartphone, Smart pad, and the like. For example, in the case of the Smartphone, the application may be effectively controlled because a desired application can be directly executed by one touch and a user's input and an application's execution are performed in one device.

Although a mobile device such as a Smartphone may be used for controlling the display apparatus, such control of the display apparatus using the Smartphone is still difficult. For example, in order for a mobile device to operate a display apparatus (e.g., a TV, and the like), compatibility is needed between the display apparatus and the mobile device. To solve this, manufacturers of the display apparatus may develop and provide a control application for the mobile device so as to control the display apparatus in consideration of the compatibility. However, because a variety of mobile devices have recently been provided with different operating systems and platform, practical difficulties associated with costs and time for developing and providing the control applications respectively dedicated for such various mobile devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a display apparatus, and a control method thereof, in which a mobile device is used to control the display apparatus, so that the display apparatus can be conveniently and effectively controlled through the mobile device without great development cost and time.

In accordance with an aspect of the present disclosure, a display apparatus is provided. The display apparatus includes an image processor configured to process an image signal, a display unit configured to display an image based on the image signal, a storage section configured to store Graphic User Interface (GUI) information about a GUI to be displayed in a mobile device for controlling the display apparatus, a web server configured to communicate with a web browser of the mobile device, and a controller configured to transmit the stored GUI information to the mobile device if the web browser of the mobile device requests the GUI information through the web server, and to operatively control the display apparatus in accordance with control information received from the mobile device.

In accordance with an aspect of the present disclosure, the GUI information may include information about a GUI of an application launcher, and the controller executes an application in accordance with control information received from the mobile device.

In accordance with an aspect of the present disclosure, the application launcher may include information about a list indicating a plurality of applications executable in the display apparatus, and the controller may execute one among the plurality of applications in accordance with control information received from the mobile device.

In accordance with an aspect of the present disclosure, the GUI information may include information about a GUI of the executed application.

In accordance with an aspect of the present disclosure, the storage section may store a plurality of GUI information, and the controller may select one GUI information corresponding to the mobile device among the plurality of stored GUI information, and transmit the selected GUI information to the mobile device.

In accordance with an aspect of the present disclosure, the controller may transmit information, which the web browser of the mobile device uses to connect with the web server, to the mobile device.

In accordance with an aspect of the present disclosure, the controller may display information, which the web browser of the mobile device uses to connect with the web server, on the display unit.

In accordance with another aspect of the present disclosure, a method of controlling the display apparatus displaying an image based on an image signal is provided. The method includes communicating with a web browser of a mobile device through a web server, transmitting GUI information about a GUI to be displayed in the mobile device for controlling the display apparatus, in response to a request from the web browser of the mobile device, receiving control information from the mobile device, and performing operations in accordance with the control information received from the mobile device.

In accordance with an aspect of the present disclosure, the GUI information may include information about a GUI of an application launcher, and the performing the operations may include executing an application in accordance with control information received from the mobile device.

In accordance with an aspect of the present disclosure, the application launcher may include information about a list indicating a plurality of applications executable in the display apparatus, and the performing the operations may include executing one among the plurality of applications in accordance with control information received from the mobile device.

In accordance with an aspect of the present disclosure, the GUI information may include information about a GUI of the executed application.

In accordance with an aspect of the present disclosure, the method may further include selecting one GUI information corresponding to the mobile device among the plurality of GUI information, wherein the transmitting of the GUI information may include transmitting the selected GUI information to the mobile device.

In accordance with an aspect of the present disclosure, the method may further include transmitting information, which the web browser of the mobile device uses to connect with the web server, to the mobile device.

In accordance with an aspect of the present disclosure, the method may further include displaying information, which the web browser of the mobile device uses to connect with the web server, on the display apparatus.

In accordance with an aspect of the present disclosure, non-transitory computer-readable storage medium storing instructions is provided. When the instructions are executed, at least one processor performs a method including communicating with a web browser of a mobile device through a web server, transmitting GUI information about a GUI to be displayed in the mobile device for controlling the display apparatus, in response to a request from the web browser of the mobile device, receiving control information from the mobile device, and performing operations in accordance with the control information received from the mobile device.

In accordance with an aspect of the present disclosure, a system for controlling a display apparatus using a mobile device is provided. The system includes the mobile device, and the display apparatus configured to communicate with the mobile device through a web server such that the display apparatus transmits Graphic User Interface (GUI) information to the mobile device upon receipt of a request for the GUI information from the mobile device via the web server, and operatively controls the display apparatus according to control information received from the mobile device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is also to be understood that the singular forms "a," "an," and "the" include plural referents unless the context clearly dictates otherwise. Thus, for example, referents to "a component surface" includes reference to one or more of such surfaces.

Below, various embodiments of the present disclosure will be described in detail.

Figure 1:
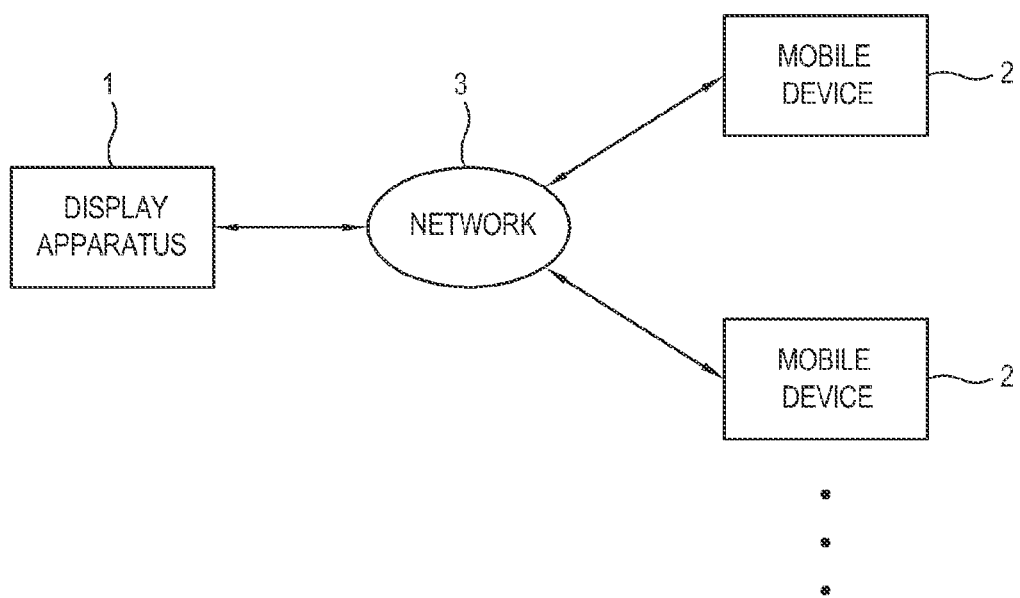
FIG. 1 is a block diagram of a display apparatus and a mobile device according to an embodiment of the present disclosure.

FIG. 1 is a block diagram of a display apparatus and a mobile device according to an embodiment of the present disclosure.

Referring to FIG. 1, the display apparatus 1 may correspond to a television (TV), and the like. A mobile device 2 may include a Smartphone, a Smart pad, a tablet Personal Computer (PC), a digital camera, a Personal Digital Assistant (PDA), an MP3 player, a portable game console, a Portable/Personal Multimedia Player (PMP), a handheld e-book, and the like.

Referring to FIG. 1, the display apparatus 1 and the mobile device 2 may connect with each other through a network 3. For example, the network 3 may include a wireless local area network such as Wi-Fi, and the like. For example, the display apparatus 1 and the mobile device 2 may be positioned so as to be adjacent to each other, and a user may use both the display apparatus 1 and the mobile device 2 within substantially the same space. A single mobile device 2 or two or more mobile devices 2 may be provided.

According to various embodiments of the present disclosure, the display apparatus 1 may provide an application service in addition to a TV function. As an example, there is no limit to the kind of applications that can be provided by the display apparatus 1. For instance, the application may be related to music, a movie, a photograph, a game, a Social Network Service (SNS), news, health, learning, and the like.

A user may use the mobile device 2 to execute and control the application provided by the display apparatus 1. The mobile device 2 provides a tactile interface. The display apparatus 1 has information associated with a Graphic User Interface (GUI) related to execution and control of the application (hereinafter, referred to as 'GUI' information), and transmits the GUI information to the mobile device 2. The mobile device 2 provides a GUI with which a user may execute and control the application in the display apparatus 1 based on the GUI information transmitted from the display apparatus 1. For example, through (e.g., using) the GUI provided in the mobile device 2, a user may execute an application of the display apparatus 1, and control the executed application. The mobile device 2 sends the display apparatus 1 information about the execution and control for the application (hereinafter, referred to as 'control information') in accordance with a user's input. The display apparatus 1 executes and controls an application desired by a user in accordance with the control information received from the mobile device 2.

Figure 2:
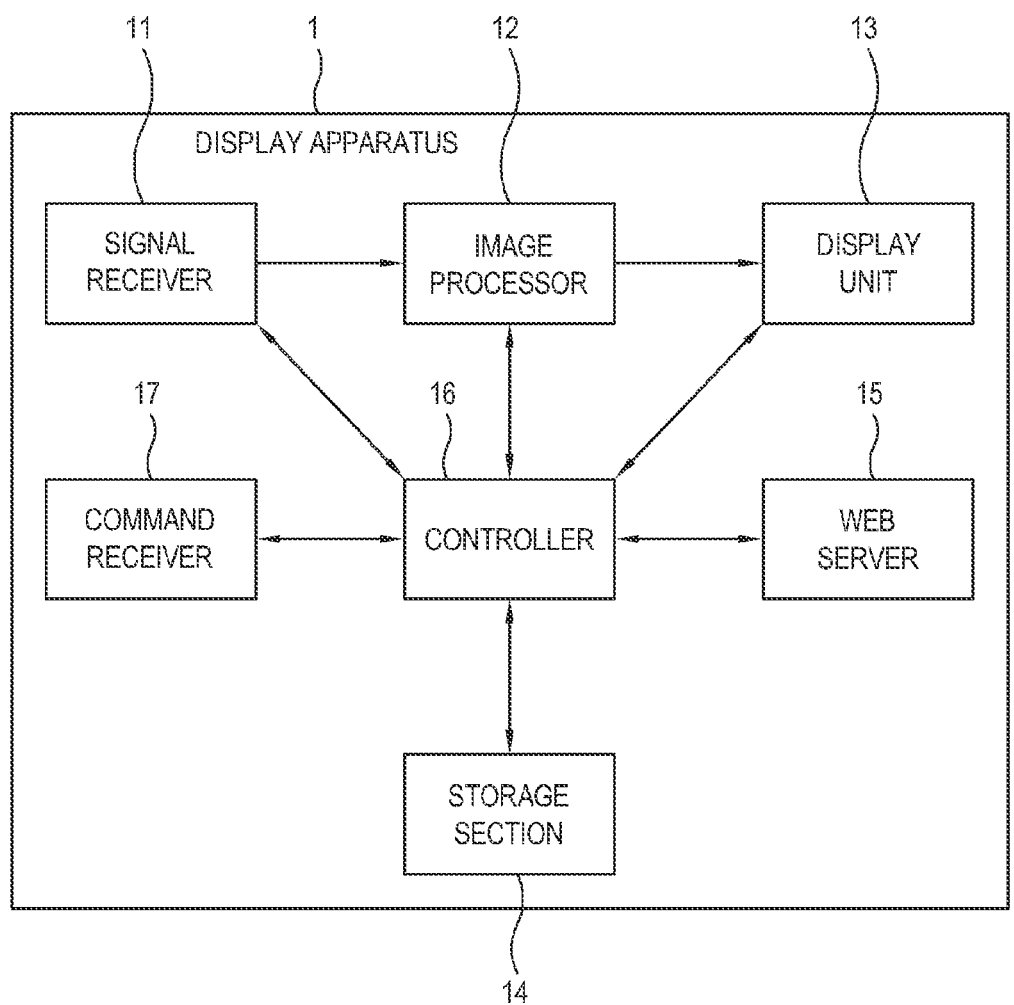
FIG. 2 is a block diagram showing a configuration of a display apparatus according to an embodiment of the present disclosure.

FIG. 2 is a block diagram showing a configuration of a display apparatus according to an embodiment of the present disclosure.

Referring to FIG. 2, the display apparatus 1 may include a signal receiver 11, an image processor 12, a display unit 13, a storage section 14, a web server 15, and a controller 16. According to various embodiments of the present disclosure, the display apparatus may also include a command receiver 17.

According to various embodiments of the present disclosure, the signal receiver 11 receives an image signal. The image signal may include a broadcasting signal, and the like. For example, the broadcasting signal may be broadcasted by airwave broadcasting, cable broadcasting, satellite broadcasting, and the like. The broadcasting signals may correspond to a plurality of channels. The signal receiver 11 receives a broadcasting signal of one channel selected by a user among a plurality of channels. The image processor 12 processes the broadcasting signal received in the signal receiver 11 to be displayed as an image on the display unit 13. According to various embodiments of the present disclosure, the image signal may for example be received from a video device such as a Digital Versatile Disc (DVD) player, a Blue-ray Disc (BD) player, a PC, and the like. As another example, the image signal may be received over the Internet a network such as Bluetooth, Wi-Fi, or the like. As another example, the image signal may be received from a memory such as a Universal Serial Bus (USB) storage medium, and the like.

According to various embodiments of the present disclosure, the image processor 12 processes the received image signal to be displayed as an image on the display unit 13. For example, the image processor 12 may perform modulation, demodulation, multiplexing, de-multiplexing, analog-digital conversion, digital-analog conversion, decoding, encoding, image enhancement, scaling, or the like with regard to the received image signal.

According to various embodiments of the present disclosure, the display unit 13 displays an image based on the image signal processed by the image processor 12. The display unit 13 may display an image through various methods such as a Liquid Crystal Display (LCD), a Plasma Display Panel (PDP), an Organic Light Emitting Diode (OLED), and the like.

According to various embodiments of the present disclosure, the storage section 14 may include a nonvolatile memory such as a flash memory, a hard disc drive, and the like which stores GUI information for the mobile device 2 with which a user may control the display apparatus 1.

According to various embodiments of the present disclosure, the web server 15 serves as a server that regards the mobile device 2 as a client. The web server 15 provides a web page in the form of Hyper Text Markup Language (HTML) to the mobile device 2, and the web server 15 may include a web server program capable of providing a web page. The web page provided by the web server 15 may include the GUI information for the mobile device 2 in order to control the display apparatus 1, or include information for obtaining the GUI information for the mobile device 2. The web server 15 may have a unique web address or domain name. If the mobile device 2 requests a web page through the web address or domain name of the web server 15, the web server 15 transmits the web page to the mobile device 2. The web server 15 may further include a communication interface for communicating with the mobile device 2 through the network 3.

According to various embodiments of the present disclosure, the controller 16 generally controls the display apparatus 1. The controller 16 may include a control program, a nonvolatile memory such as a flash memory or the like to store the control program, a volatile memory such as a Random Access Memory (RAM) for loading at least a part of the control program, and a microprocessor for executing the loaded control program. The control program of the controller 16 and the web server program of the web server 15 may be executed by one microprocessor.

Figure 3:
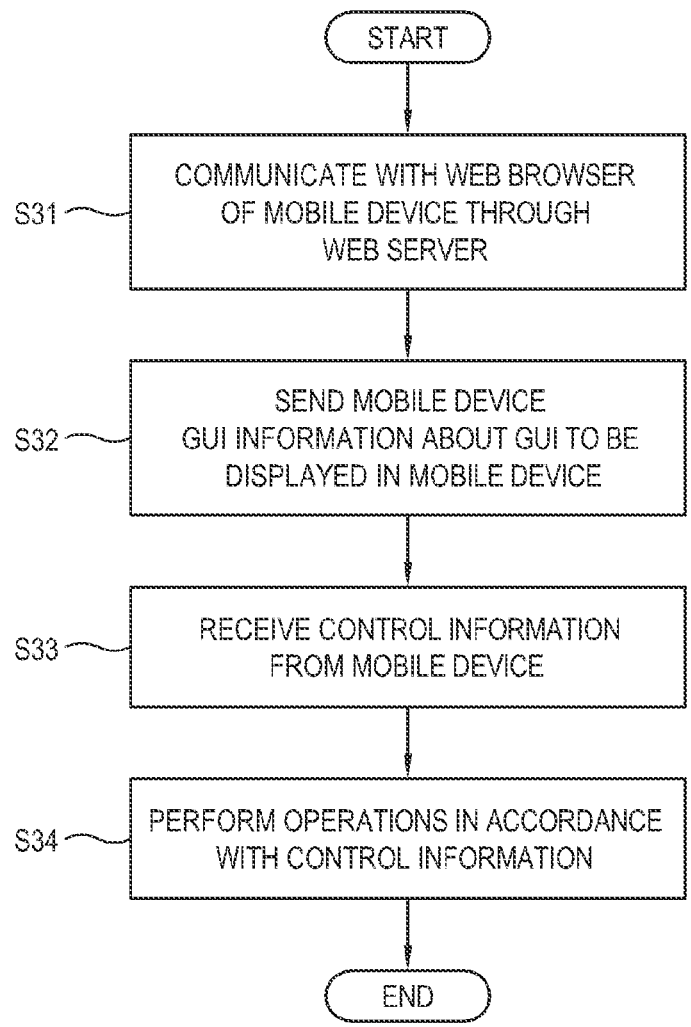
FIG. 3 is a flowchart showing operations of a display apparatus according to an embodiment of the present disclosure.

FIG. 3 is a flowchart showing operations of a display apparatus according to an embodiment of the present disclosure.

Referring to FIG. 3, a flowchart illustrating operations of the display apparatus under control of a controller according to an embodiment of the present disclosure is illustrated.

At operation S31, the display apparatus 1 uses the web server 15 to communicate with a web browser of the mobile device 2.

At operation S32, the display apparatus 1 sends the mobile device 2 the GUI information to be displayed on the mobile device 2.

At operation S33, the display apparatus 1 receives the control information from the mobile device 2.

At operation S34, the display apparatus 1 performs operations in accordance with the control information received from the mobile device 2.

Referring back to FIG. 2, the display apparatus 1 may further include a command receiver 17 to receive a user's command. For example, the command receiver 17 may further include a remote controller signal receiver to receive a remote controller signal, which includes a user's command, from a remote controller. Further, the command receiver 17 may include a control panel with a plurality of buttons for inputting a user's command. The command receiver 17 may include a motion sensor for detecting a user's motion as a user's command. Although not shown, the display apparatus 1 may further include a power supply for supplying operation power to the display apparatus 1.

Figure 4:
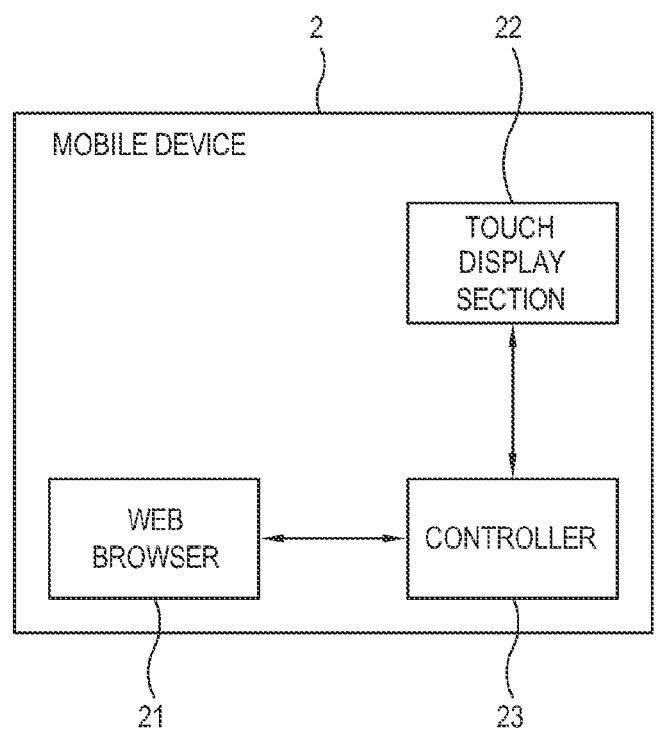
FIG. 4 is a block diagram showing a configuration of a mobile device according to an embodiment of the present disclosure.

FIG. 4 is a block diagram showing a configuration of a mobile device according to an embodiment of the present disclosure.

Referring to FIG. 4, the mobile device 2 may include a web browser 21, a touch display section 22, and a controller 23.

According to various embodiments of the present disclosure, the web browser 21 may be connected to the web server 15 of the display apparatus 1 and receives the web page from the web server 15, thereby showing the content of the web page. The web browser 21 may include a web browser program, and a communication interface for communicating with the display apparatus 1 through the network 3.

According to various embodiments of the present disclosure, the touch display section 22 is a touch type display, which displays a predetermined image and receives a user's touch input on the image. The controller 23 generally controls the mobile device 2. The controller 23 may include a control program, a nonvolatile memory such as a flash memory for storing the control program, a volatile memory such as a RAM for loading at least a part of the control program, and a microprocessor for executing the loaded control program. Both the control program of the controller 23 and the web browser program of the web browser 21 may be executed by one microprocessor.

Figure 5:
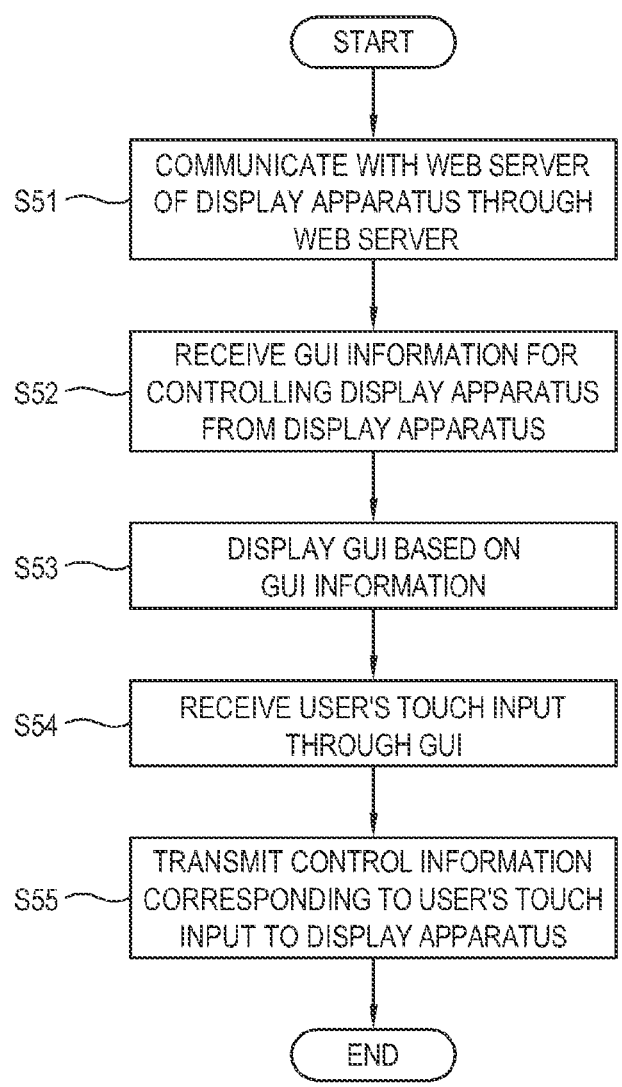
FIG. 5 is a flowchart showing operations of a mobile device according to an embodiment of the present disclosure.

FIG. 5 is a flowchart showing operations of a mobile device according to an embodiment of the present disclosure.

Referring to FIG. 5, a flowchart showing operations of the mobile device 2 under control of a controller according to an embodiment of the present disclosure is provided.

At operation S51, the mobile device 2 communicates with the web server 15 of the display apparatus 1 through the web browser 21.

At operation S52, the mobile device 2 receives the GUI information for control of the display apparatus 1 from the display apparatus 1.

At operation S53, the mobile device 2 displays a GUI based on the GUI information received from the display apparatus 1.

At operation S54, the mobile device 2 receives a user's touch input through the GUI.

At operation S55, the mobile device 2 sends the display apparatus 1 the control information corresponding to a user's touch input.

Figure 6:
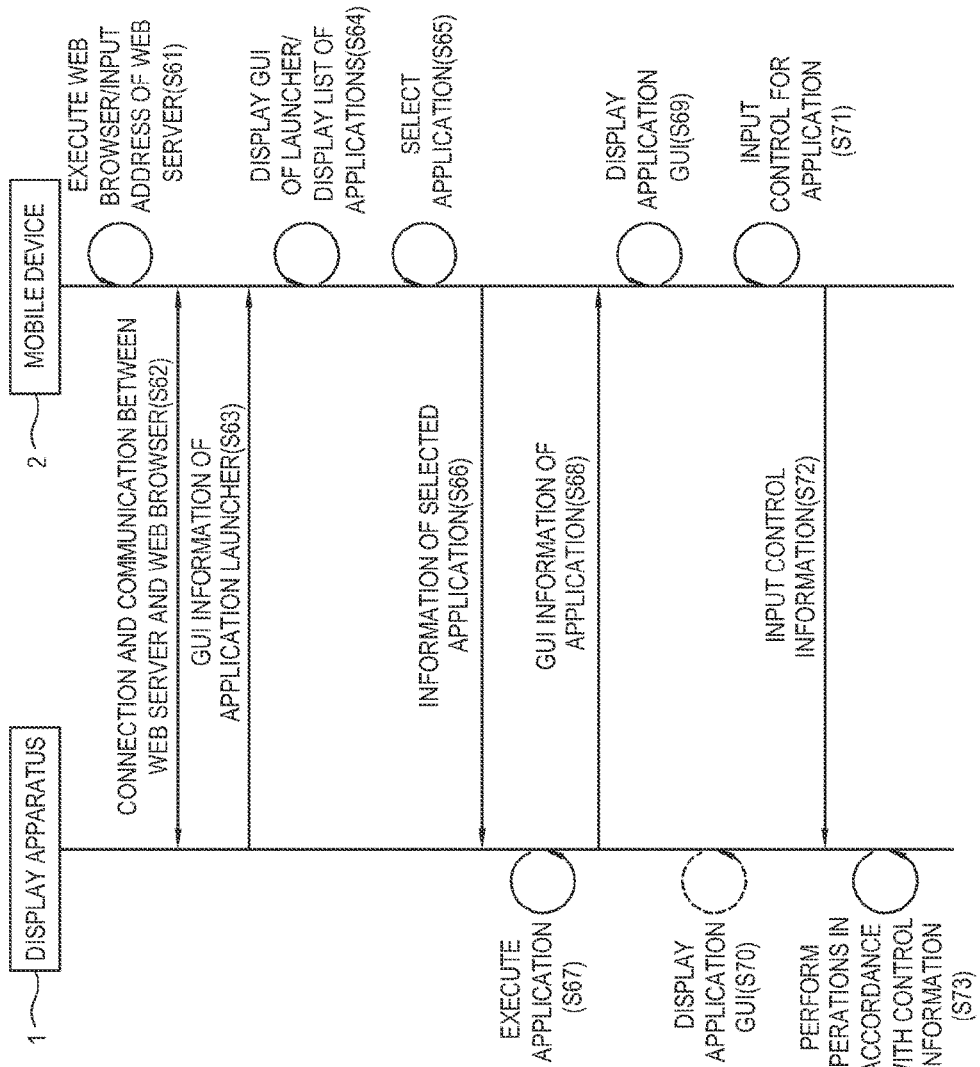
FIG. 6 illustrates more detailed operations of a display apparatus and a mobile device according to an embodiment of the present disclosure.

FIG. 6 illustrates more detailed operations of a display apparatus and a mobile device according to an embodiment of the present disclosure.

Referring to FIG. 6, at operation S61, the mobile device 2 executes the web browser 21 in accordance with a user's request. According to various embodiments of the present disclosure, when the mobile device 2 enters a communication enabled zone in which the mobile device 2 can communicate with the display apparatus 1, the mobile device 2 informs a user that the mobile device 2 can communicate with the display apparatus 1 and then executes the web browser 21 automatically or after receiving a user's approval.

A user may input a domain name or a web address of the web server 15 of the display apparatus 1 through the address box, a search box, a favorites, and the like of the web browser 21. According to various embodiments of the present disclosure, the mobile device 2 receives information about the domain name or the web address of the web server 15 from the display apparatus 1, and directly connects with the web server 15 automatically or after receiving the approval of a user based on the received information. The display apparatus 1 may apply authentication to the mobile device 2 as a control device for the display apparatus 1 under the approval of a user at previous connection with the mobile device 2. When the mobile device 1 is completely authenticated, the display apparatus 1 may store identification information of the mobile device 2 as authentication information in the storage section 14. The display apparatus 1 determines whether the mobile device 2 is an authenticated control device based on the identification information stored in the storage section 14 when the communication with the mobile device 2 is enabled again. The display apparatus 1 may transmit information such as the web address or the like of the web server 15 to the mobile device 2 if the mobile device 2 is determined as the authenticated control device. Alternatively, the display apparatus 1 may transmit information such as the web address of the web server 15 to the mobile device 2 without any separate authentication anytime when a user requests such a transmission.

Alternatively, if there is a user's request or the communication with the mobile device 2 is enabled, the display apparatus 1 may display the information such as the web address or the like of the web server 15 on the display unit 13. A user may refer to the information displayed on the display unit 13, and input the web address or the like of the web server 15 of the display apparatus 1 through the address window or the like of the web browser 21.

At operation S62, the mobile device 2 uses the web browser 21 to connect with the web server 15 of the display apparatus 1, thereby performing communication. The mobile device 2 receives the web page from the web server 15 of the display apparatus 1 through the web browser 21 and displays the web page on the touch display section 22.

At operation S63, the display apparatus 1 may transmit the GUI information of the application launcher to the mobile device 2 through the web server 15. The display apparatus 1 may be provide with a plurality of applications, and thus a user can use a desired application among the plurality of applications. The application launcher provides information for executing the application desired by a user among the plurality of applications. The GUI information of the application launcher may be directly included in the web page, or be acquired in the form of a link involved in the web page.

At operation S64, the mobile device 2 displays the GUI of the application launcher based on the GUI information received from the display apparatus 1.

Figure 7:
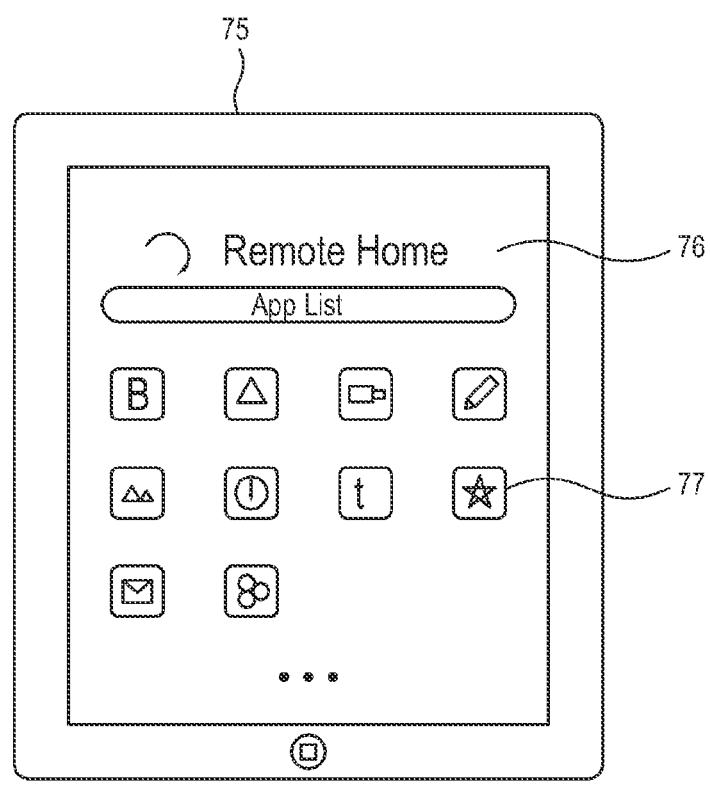
FIGS. 7 and 8 are examples of a Graphic User Interface (GUI) of an application launcher according to an embodiment of the present disclosure.
Figure 8:
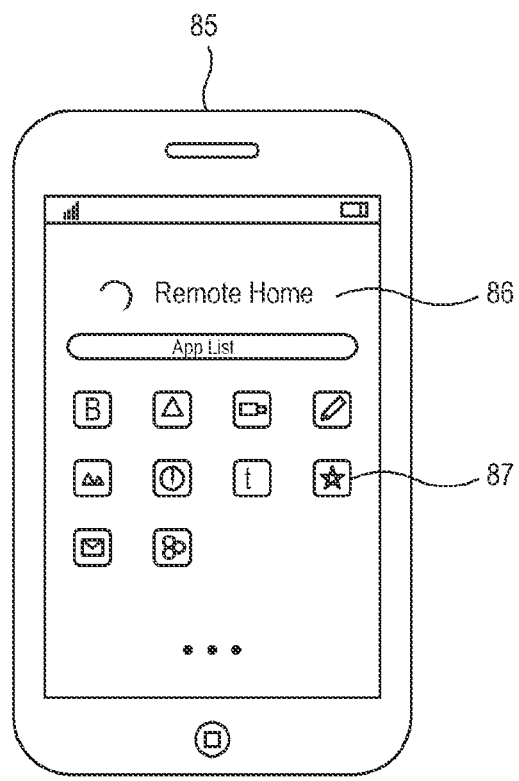

FIGS. 7 and 8 are examples of a GUI of an application launcher according to an embodiment of the present disclosure.

Referring to FIGS. 7 and 8, the mobile devices 75 and 85 may display the GUIs 76 and 86 of the application launcher for controlling the display apparatus 1 on the touch display section 22. The GUIs 76 and 86 of the application launcher may provide information about a list of a plurality of applications executable in the display apparatus 1. For example, the list of plural applications may be shown in the form of icons 77 and 87.

At operation S65, a user may select, for example, touch one corresponding to an application desired among the plurality of icons 77 and 87 shown in the GUIs 76 and 86 of the application launcher. The GUI information received from the display apparatus 1 may include not only the information of the GUIs 76 and 86 of the application launcher, but also logic or code information for selecting the application through the GUIs 76 and 86.

At operation S66, the mobile device 2 transmits the information about the application selected by a user among the plurality of applications to the display apparatus 1.

At operation S67, if receiving information about the selected application from the mobile device 2, the display apparatus 1 executes the corresponding application.

Next, at operation S68, the display apparatus 1 transmits the GUI information of the executed application to the mobile device 2.

Next, at operation S69, the mobile device 2 displays the GUI (not shown) of the application being executed in the display apparatus 1, based on the GUI information received from the display apparatus 1. The GUI of the application is displayed on the mobile device 2, and therefore the display apparatus 1 may not separately display the GUI. Therefore, display of the GUI and control of the application is more convenient for a user because the executed application can be controlled through the mobile device 2 without any interruption while the user watches the screen of the application executed in the display apparatus 1.

Alternatively, according to various embodiments of the present disclosure, at operation S70, the display apparatus 1 may display the display apparatus's GUI (not shown) of the executed application on the display unit 13, separately from the mobile device 2. In this case, the display apparatus 1 may display the display apparatus's GUI with a small size in only a predetermined region on the screen so as not to excessively interrupt the screen of the executed application. The display apparatus's UI may be controlled by the remote controller or a command receiver of the display apparatus 1.

At operation S71, the mobile device 2 receives a user's control command for controlling the application being executed in the display apparatus 1 through the GUI of the application. The GUI of the application may be varied depending on content of the corresponding application. For example, in the case of a music application, information about many reproducible songs, and items for allowing a user to do selection, play, and the like with regard to the user's desired songs may be provided. As another example, in the case of a game application, information about game content, and input items for game control may be provided. Because a user may conveniently control the application being executed in the display apparatus 1 in accordance with characteristics by touch input through the GUI of the application provided in the mobile device 2, a user's experience can be enhanced beyond simple control of the existing remote controller.

At operation S72, the mobile device 2 sends the display apparatus 1 the control information input by a user through the GUI of the application.

At operation S73, the display apparatus 1 performs operations corresponding to the application being currently executed under control information received from the mobile device 2. According to various embodiments of the present disclosure, receiving the GUI information for controlling the display apparatus 1 through the web browser 21 provided in the mobile device 2 is possible. Therefore, there is no need of separately developing a program for the GUI dedicated for an individual mobile device 2, thereby decreasing costs, efforts, and the like. The management of the program for controlling the display apparatus 1 is unified in only the display apparatus 1, and therefore designing the program is effective. Further, because the web browser 22 can be continuously managed in the display apparatus 1 even though the web browser 22 is terminated in the mobile device 2, the management is easy and the resource efficiency can be improved.

Figure 9:
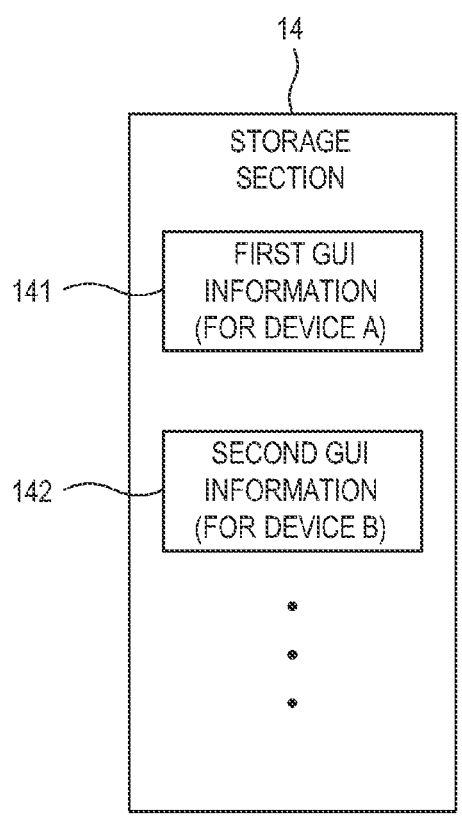
FIG. 9 illustrates a storage section of a display apparatus according to an embodiment of the present disclosure.

FIG. 9 illustrates a storage section of a display apparatus according to an embodiment of the present disclosure.

Referring to FIG. 9, according to various embodiments of the present disclosure, the storage section 14 may store a plurality of GUI information including first GUI information 141, second GUI information 142, and the like. The plurality of GUI information 141, 142, . . . may respectively correspond to the characteristics of the plural mobile devices 2. The characteristics of the mobile devices 2 may for example include the operating system, platform, product specification, and the like of the mobile device 2. As an example, according to various embodiments of the present disclosure, the first GUI information 141 corresponds to a device A as the mobile device 2, and the second GUI information 142 corresponds to a device B as the mobile device 2. The device A and the device B may be different in the operating system, platform, and the like from each other. For example, a difference in the operating system, platform, and the like may cause a different display resolution of the mobile device 2. The plurality of GUI information 141, 142, . . . may for example include information of the GUI corresponding to the display resolution of the relevant mobile device 2. The display apparatus 1 ascertains the characteristics of the mobile device 2 when connecting with the mobile device 2, and selects a GUI information corresponding to the connected mobile device 2 among the plurality of GUI information 141, 142, . . . , thereby transmitting the selected GUI information to the mobile device 2. Accordingly, the mobile device 2 provides a user with a GUI corresponding to the mobile device's 2 characteristic, and thus further improves a user's convenience. The plurality of GUI information 141, 142, . . . may be provided along with the corresponding GUI information for the display apparatus in the form of a package for each application.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A display apparatus comprising:
a display configured to display an image based on an image signal;
memory configured to store a plurality of graphical user interface (GUI) information comprising at least a first GUI about an application launcher including information about a list of a plurality of applications executable in the display apparatus, a second GUI for controlling an operation of the plurality of applications executed in the display apparatus, and characteristics of the mobile device comprising at least one of an operating system, a platform, or a product specification of a mobile device; and
at least one processor configured to:
communicate a web browser of the mobile device through a web server comprised within the display apparatus;
receive a request of the GUI information about the first GUI from the web browser of the mobile device;
transmit the stored GUI information about the first GUI corresponding to the characteristic of the mobile device to the mobile device to display the first GUI on the mobile device via the web server of the display apparatus in response to the received request of the GUI information from the web browser of the mobile device;
in response to one of the plurality of applications of the display apparatus being selected by a first user input on the first GUI received from the mobile device, transmit information about the selected application to the display apparatus, execute a corresponding application in the display device associated with the selected application on the mobile device, display the second GUI corresponding to the executed application in a predetermined region on the display of the display device, and transmit the stored GUI information about the second GUI corresponding to the characteristic of the mobile device to the mobile device to display the second GUI for controlling an operation of the selected application on the mobile device while the second GUI is displayed on the predetermined region of the display of the display device to control by the mobile device or the second GUI displayed on the display apparatus; and
control the operation of the executed application in the display apparatus according to a second user input from the mobile device, the second user input being input in response to the displayed second GUI on the mobile device.

2. The display apparatus according to claim 1, wherein the at least one processor executes an application in accordance with control information received from the mobile device.

3. The display apparatus according to claim 2, wherein the at least one processor is further configured to execute one among the plurality of applications in accordance with control information received from the mobile device.

4. The display apparatus according to claim 2, wherein the GUI information comprises information about a GUI of the executed application in the display device.

5. The display apparatus according to claim 1, wherein the at least one processor is further configured to:
select one GUI information corresponding to the selected application in the mobile device among the plurality of stored GUI information, and
transmit the selected GUI information to the mobile device.

6. A method of controlling a display apparatus displaying an image based on an image signal, the method comprising:
storing a plurality of graphical user interface (GUI) information comprising at least a first GUI for an application launcher including information about a list of a plurality of applications executable in the display apparatus, a second GUI for controlling an operation of the plurality of applications executed in the display apparatus, and characteristics of the mobile device comprising at least one of an operating system, a platform, or a product specification of a mobile device;
communicating with a web browser of a mobile device through a web server comprised within the display apparatus;
receiving a request of GUI information about the first GUI from the web browser of the mobile device;
transmitting stored GUI information about the first GUI corresponding to the characteristic of the mobile device to the mobile device to display the first GUI on the mobile device via the web server of the display apparatus in response to the received request of the GUI information from the web browser of the mobile device;
in response to one of the plurality of applications of the display apparatus being selected by a first user input on the first GUI received from the mobile device, transmitting information about the selected application to the display apparatus, executing a corresponding application in the display device associated with the selected application on the mobile device, displaying the second GUI corresponding to the executed application in a predetermined region on a display of the display apparatus, and transmitting the stored GUI information about the second GUI corresponding to the characteristic of the mobile device to the mobile device to display the second GUI for controlling an operation of the selected application on the mobile device while the second GUI is displayed on the predetermined region of the display of the display apparatus to control by the mobile device or the second GUI displayed on the display apparatus; and controlling the operation of the executed application in the display apparatus according to a second user input from the mobile device, the second user input being input in response to the displayed second GUI on the mobile device.

7. The method according to claim 6,
wherein the performing the operations comprises executing an application in accordance with control information received from the mobile device.

8. The method according to claim 7,
wherein the performing the operations comprises executing one among the plurality of applications in accordance with control information received from the mobile device.

9. The method according to claim 7, wherein the GUI information comprises information about a GUI of the executed application in the display device.

10. The method according to claim 6, further comprising selecting one GUI information corresponding to the selected application in the mobile device among the plurality of GUI information,
wherein the transmitting of the GUI information comprises transmitting the selected GUI information to the mobile device.

11. A non-transitory computer-readable storage medium storing instructions that, when executed, cause at least one processor to perform the method of claim 6.

12. A system for controlling a display apparatus using a mobile device, the system comprising:
the mobile device; and
the display apparatus comprising a web server, the display apparatus configured to:
store a plurality of graphical user interface (GUI) information comprising at least a first GUI about an application launcher including information about a list of a plurality of applications executable in the display apparatus, a second GUI for controlling an operation of the plurality of applications executed in the display apparatus, and characteristics of the mobile device comprising at least one of an operating system, a platform, or a product specification of a mobile device;
communicate a web browser of the mobile device through the web server comprised within the display apparatus;
receive a request of the GUI information about the first GUI from the web browser of the mobile device;
transmit stored GUI information about the first GUI corresponding to the characteristic of the mobile device to the mobile device to display the first GUI on the mobile device via the web server of the display apparatus in response to the received request of the GUI information from the web browser of the mobile device;
in response to one of the plurality of applications of the display apparatus being selected by a first user input on the first GUI received from the mobile device, transmit information about the selected application to the display apparatus, execute a corresponding application in the display device associated with the selected application on the mobile device, display the second GUI corresponding to the executed application in a predetermined region on a display of the display apparatus, and transmit the stored GUI information about the second GUI corresponding to the characteristic of the mobile device for controlling an operation of the selected application to the mobile device to display the second GUI on the mobile device while the second GUI is displayed on the predetermined region of the display of the display apparatus to control by the mobile device or the second GUI displayed on the display apparatus; and
control the operation of the selected application according to a second user input from the mobile device, the second user input being input in response to the displayed second GUI on the mobile device.

13. The system of claim 12, wherein the GUI information relates to a GUI with which the display apparatus is controlled using the mobile device.

14. The system of claim 12, wherein the display apparatus further comprises:
the display configured to display an image operatively based on an image signal.

* * * * *